United States Patent [19]
Kuwajima et al.

[11] Patent Number: 5,688,591
[45] Date of Patent: Nov. 18, 1997

[54] MAGNETIC RECORDING MEDIUM CONTAINING AN UNSATURATED FATTY ACID DIESTER OF A DIHYDRIC ALCOHOL

[75] Inventors: Takayoshi Kuwajima; Hideki Sasaki, both of Nagano, Japan

[73] Assignee: TDK Corporation, Tokyo, Japan

[21] Appl. No.: 358,476

[22] Filed: Dec. 19, 1994

[30] Foreign Application Priority Data

Dec. 27, 1993 [JP] Japan ............... 5-353921

[51] Int. Cl.$^6$ ............... G11B 05/70
[52] U.S. Cl. ............... 428/323; 428/694 BP; 428/694 BN; 428/900
[58] Field of Search ............... 428/694 B, 694 BP, 428/694 BN, 694 ST, 900, 64, 65, 928, 323

[56] References Cited

U.S. PATENT DOCUMENTS

| | | | |
|---|---|---|---|
| 4,203,856 | 5/1980 | Pardee | 252/54.6 |
| 4,232,072 | 11/1980 | Pardee | 428/65 |
| 5,164,239 | 11/1992 | Ozawa et al. | 428/64 |

FOREIGN PATENT DOCUMENTS

| | | |
|---|---|---|
| 0 430 498 | 6/1991 | European Pat. Off. . |
| 56-119933 | 9/1981 | Japan . |
| 58-31655 | 7/1983 | Japan . |
| 61-50215 | 3/1986 | Japan . |
| 61-214217 | 9/1986 | Japan . |
| 2-110821 | 4/1990 | Japan . |
| 4-49171 | 8/1992 | Japan . |
| 4-70690 | 11/1992 | Japan . |
| 5-12766 | 2/1993 | Japan . |
| 2 002 813 | 2/1979 | United Kingdom . |

*Primary Examiner*—Stevan A. Resan
*Attorney, Agent, or Firm*—Oblon, Spivak, McClelland, Maier & Neustadt, P.C.

[57] ABSTRACT

A magnetic recording medium has a magnetic layer on a non-magnetic substrate. The magnetic layer contains ferromagnetic powder dispersed in a binder and a lubricant which is an unsaturated fatty acid diester of a dihydric alcohol and an unsaturated fatty acid, preferably a $C_{2-6}$ dihydric alcohol and a $C_{14-24}$ unsaturated fatty acid, typically neopentyl glycol dioleate. The lubricant remains effective in low-temperature, high-temperature, and thermal cycling environments without bleed-out. The medium is low in rotational torque, abrasion resistant and durable.

9 Claims, 1 Drawing Sheet

MAGNETIC RECORDING MEDIUM CONTAINING AN UNSATURATED FATTY ACID DIESTER OF A DIHYDRIC ALCOHOL

BACKGROUND OF THE INVENTION

1. Field of the Invention

This invention relates to a magnetic recording medium of the coating type.

2. Prior Art

In general, magnetic recording media of the coating type include a non-magnetic substrate and a magnetic layer coated thereon having ferromagnetic powder, inorganic additives and other components dispersed in a binder. The magnetic layer is required to be highly abrasion resistant and durable because it comes in dynamic sliding contact with the magnetic head, pad, capstan, liner and other members during record and playback operations. Since magnetic recording media are now used in a wider variety of environments, they are required to be satisfactorily durable even in an environment where temperature and humidity change drastically.

As to magnetic disks, in response to a demand for power saving of the disk drive, attempts were made to reduce rotational torque as low as possible for reducing the load to the motor, for example, by reducing friction with the magnetic head. It is then a common practice to add various lubricants to the magnetic layer for reducing abrasion of the magnetic layer, minimizing the rotational torque, and improving durability.

Known examples of the lubricant include esters of monohydric alcohols such as oleyl oleate (JP-B 49171/1992 and 12766/1993), oleyl stearate (JP-B 70690/1992), and isocetyl oleate; esters of polyhydric alcohols and saturated fatty acids such as ethylene glycol monopalmitate and ethylene glycol dilaurate (JP-A 110821/1990), propylene glycol distearate and glyceryl distearate; unsaturated fatty acid monoesters of dihydric alcohols and unsaturated fatty acids such as propylene glycol monooleate (JP-A 50215/1986); glycerin esters such as glyceryl trioleate (JP-B 31655/1983), glyceryl oleate dibehenate and glyceryl tribehenate (JP-A 214217/1986); α-fatty acid esters of glycerin (JP-A 119933/1981); fatty acids, liquid paraffin, and wax.

However, these lubricants are not fully satisfactory at present. For example, the esters of monohydric alcohols and fatty acids such as oleyl stearate and isocetyl oleate are insufficient to improve durability. Oleyl oleate, which has unsaturated bonds in both alcohol and fatty acid moieties and is viscous below the freezing point, improves durability in a low-temperature environment to some, but unsatisfactory extent, and is less effective particularly in a thermal cycling environment where temperature repeatedly changes between high and low levels. The esters of polyhydric alcohols and saturated fatty acids such as ethylene glycol monopalmitate, ethylene glycol dilaurate, propylene glycol distearate, and glycerin distearate are less diffusible into the magnetic layer and less effective for improving durability. The unsaturated fatty acid monoesters of polyhydric alcohols and unsaturated fatty acids such as propylene glycol monooleate and glyceryl monooleate are still insufficient for improving durability. The glycerin esters such as glyceryl dioleate, glyceryl trioleate, and glyceryl oleate dibehenate are less compatible with the binder in the magnetic layer and tend to bleed out of the magnetic layer surface and increase the starting torque (adsorption torque) because of viscosity.

SUMMARY OF THE INVENTION

An object of the present invention is to provide a novel and improved magnetic recording medium having a magnetic coating containing a lubricant which stays in the magnetic coating in a stable manner at high and low temperatures and does not bleed out so that the magnetic coating maintains lubricating effect in a thermal cycling environment, the medium featuring reduced starting and dynamic torques and improved abrasion resistance and durability.

According to the present invention, there is provided a magnetic recording medium comprising a non-magnetic substrate and a magnetic layer thereon. The magnetic layer containing a binder, ferromagnetic powder, and an unsaturated fatty acid diester of a dihydric alcohol and an unsaturated fatty acid.

Preferably the dihydric alcohol has 2 to 6 carbon atoms, with a normal or branched, saturated or unsaturated dihydric alcohol having 2 to 6 carbon atoms being more preferred. Preferably the unsaturated fatty acid has 14 to 24 carbon atoms and contains 1 to 4 unsaturated bonds. The preferred acids are palmitoleic acid, petroselinic acid, oleic acid, linoleic acid, linolenic acid and erucic acid. Most preferred as the unsaturated fatty acid diester is neopentyl glycol dioleate.

Preferably the magnetic layer contains 100 parts by weight of the ferromagnetic powder, about 0.1 to about 20 parts by weight of the unsaturated fatty acid diester, and about 5 to about 120 parts by weight of the binder.

The magnetic recording medium of the invention has a magnetic layer which contains as a lubricant an unsaturated fatty acid diester of a dihydric alcohol and an unsaturated fatty acid. The preferred dihydric alcohols are glycols having 2 to 6 carbon atoms and the preferred unsaturated fatty acids have 4 to 24 carbon atoms and at least one unsaturated bond between carbon atoms of the alkyl group. Though the invention is not bound to the theory, the unsaturated fatty acid diester lubricant has adequate steric hindrance and adequate viscosity in the magnetic layer and remains stable in a diffused state within the magnetic layer, probably because of the chain length and unsaturated bond of the diester. Since the lubricant maintains adequate viscosity in the magnetic layer even in a low-temperature environment, the magnetic recording medium of the invention has the advantages that in floppy disk form, the starting and dynamic torques are low enough in a room temperature/high humidity environment, and in video tape form, still performance is good and head clogging is minimized. Improvements in abrasion resistance and durability of the magnetic layer are significant especially in a thermal cycling environment.

BRIEF DESCRIPTION OF THE DRAWINGS

The only figure.

DETAILED DESCRIPTION OF THE INVENTION

Figure 1:
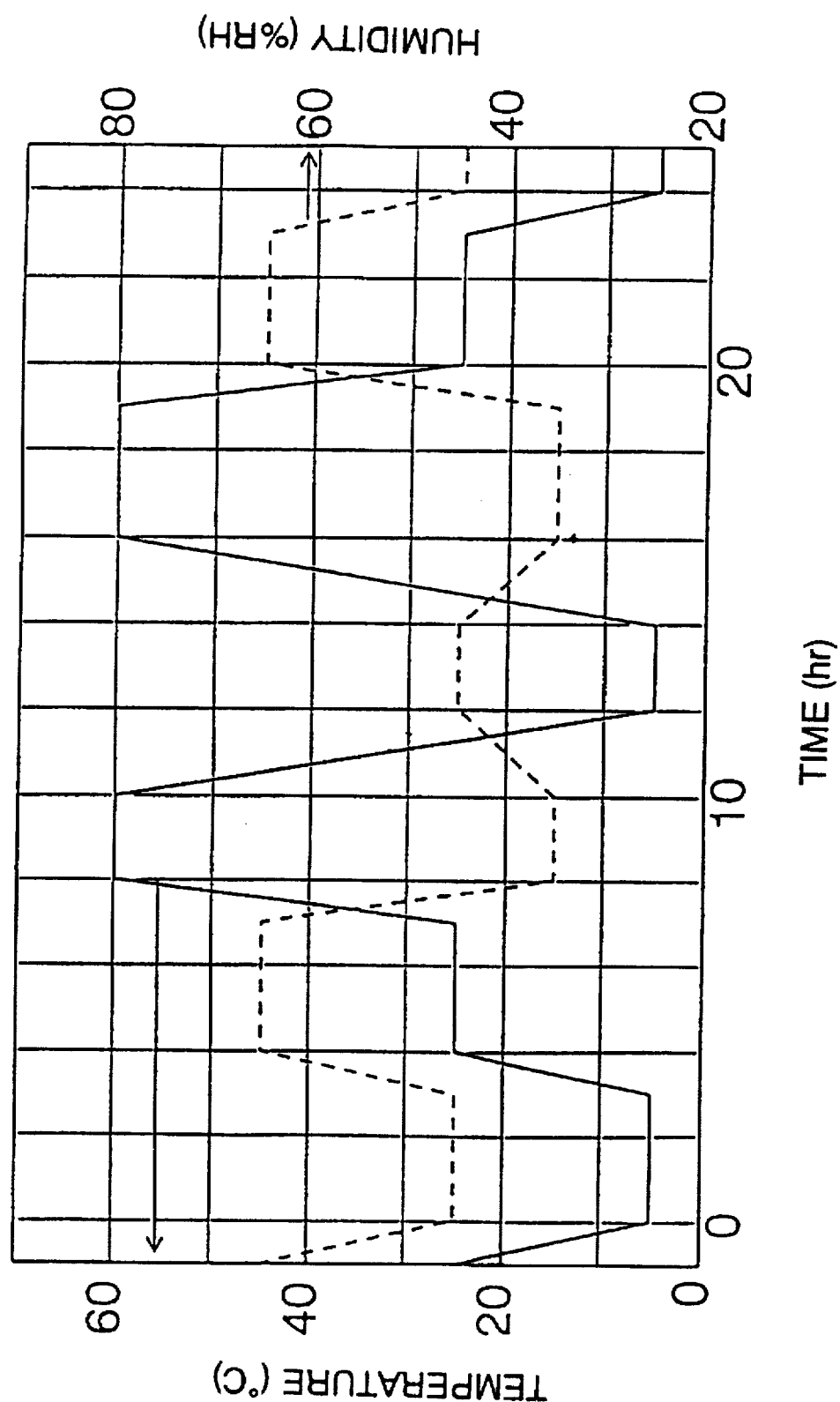
FIG. 1 is a graph showing the 24-hour temperature and humidity change pattern used in a thermal cycling test.

The magnetic recording medium of the invention includes a magnetic layer on a non-magnetic substrate. The magnetic layer contains a ferromagnetic powder, a binder, and a lubricant in the form of an unsaturated fatty acid diester of a dihydric alcohol and an unsaturated fatty acid.

The material of which the non-magnetic substrate is made is not critical. A choice may be made among various flexible materials and rigid materials depending on a particular purpose. The material is formed into an article of predetermined shape and size such as disk and tape in accordance with the given standard. Exemplary materials are resins including polyesters such as polyethylene terephthalate and polyethylene naphthalate, polyolefins such as polypropylene, polyamides, polyimides, and polycarbonates.

Used as the lubricant is an unsaturated fatty acid diester of a dihydric alcohol and an unsaturated fatty acid. The diester used herein means that two molecules of unsaturated fatty acid are bonded with one molecule of dihydric alcohol.

With respect to the alcohol component of the unsaturated fatty acid diester used in the magnetic recording medium of the invention, no particular limit is imposed as long as it is dihydric. Preferred are dihydric alcohols having 2 to 6 carbon atoms, more preferably normal or branched, saturated or unsaturated dihydric alcohols. Such dihydric alcohols further having two hydroxyl groups attached to opposite ends of the carbon chain are most preferred. If the alcohol component has too much carbon atoms, the unsaturated fatty acid diester would have less steric hindrance, fail to maintain adequate viscosity and tend to solidify at low temperature. Diesters of monohydric alcohols are less effective for improving durability and diesters of monohydric alcohols with some fatty acids fail to suppress dynamic torque. If tri- or polyhydric alcohols such as glycerin are used, monoesters are less effective for improving durability and di- and tri-esters with unsaturated fatty acids tend to exacerbate starting torque and durability in a thermal cycling environment.

Preferred among the dihydric alcohol component are ethylene glycol, propane diol, propene diol, butane diol, butene diol, pentane diol, pentene diol, hexane diol, hexene diol, neopentyl glycol, diethylene glycol, and triethylene glycol. Ethylene glycol and neopentyl glycol are more preferred.

With respect to the acid component, no particular limit is imposed as long as it is an unsaturated fatty acid. Preferred unsaturated fatty acids have 14 to 24 carbon atoms, more preferably 16 to 22 carbon atoms and contain 1 to 4 unsaturated bonds in the alkyl group, especially 1 or 2 unsaturated bonds in the alkyl group. The position of an unsaturated bond in the alkyl group is not particularly limited, either cis or trans type is acceptable, and a partially branched chain structure is acceptable. If the acid component has too fewer carbon atoms, the diesters would be less viscous and less effective for improving durability. If the acid component has too much carbon atoms, the diester would be too viscous or likely to solidify and less effective for improving durability, and tend to increase starting torque. If the acid component is free of an unsaturated bond, the diester would be less diffusible in the magnetic layer and likely to bleed out and aggravate durability. If the acid component contains too much unsaturated bonds, the diester would be less stable and likely to degrade with the lapse of time.

Preferred among the unsaturated fatty acid components are palmitoleic acid (9-hexadecenoic acid), petroselinic acid (cis-6-octadecenoic acid), oleic acid, linoleic acid, linolenic acid, and erucic acid. Oleic acid is most preferred for cost and stability with time.

The unsaturated fatty acid diesters used herein include all combinations of the above-mentioned dihydric alcohols and unsaturated fatty acids. Examples include
ethylene glycol dipalmitoleate,
ethylene glycol dipetroselinate,
ethylene glycol dioleate,
ethylene glycol dilinolate,
ethylene glycol dilinolenate,
ethylene glycol dierucate,
propylene glycol dipalmitoleate,
propylene glycol dipetroselinate,
propylene glycol dioleate,
propylene glycol dilinolate,
propylene glycol dilinolenate,
propylene glycol dierucate,
neopentyl glycol dipalmitoleate,
neopentyl glycol dipetroselinate,
neopentyl glycol dioleate,
neopentyl glycol dilinolate,
neopentyl glycol dilinolenate,
neopentyl glycol dierucate, etc.

Also useful are those combinations of the above-mentioned dihydric alcohols and unsaturated fatty acids wherein two different unsaturated fatty acid component molecules are bonded to one alcohol component molecule.

These unsaturated fatty acid diesters preferably have a melting point of lower than about 10° C. The lower limit of the melting point is generally −50° C. though not limited thereto. Those diesters having a too high melting point would be less effective for improving durability in a low-temperature environment, especially in a thermal cycling environment.

The unsaturated fatty acid diesters may be used alone or in admixture of two or more. When they are used alone or in admixture, inclusion of ethylene glycol dioleate, propylene glycol dioleate or neopentyl glycol dioleate is recommended. Inclusion of neopentyl glycol dioleate is especially recommended because of enhanced steric hindrance of the alkyl moiety in its dihydric alcohol component in the magnetic layer, viscosity, molecular balance, and cost.

Preferably the unsaturated fatty acid diester is contained in the magnetic layer in an amount of about 0.1 to about 20 parts by weight, more preferably about 0.3 to about 18 parts by weight, especially about 1 to about 15 parts by weight, most preferably about 3 to about 12 parts by weight per 100 parts by weight of the ferromagnetic powder. Less contents of the diester would be less effective for improving durability in a low-temperature environment, a high-temperature/low-humidity environment and a thermal cycling environment. Much contents of the diester would bleed out of the magnetic layer surface and adhere to the magnetic head, resulting in output drops.

Any desired method may be employed for incorporating the unsaturated fatty acid diester into the magnetic layer as long as the diester is uniformly distributed in the magnetic layer. For example, the diester is dispersed in a binder together with the ferromagnetic powder to form a magnetic paint which is conventionally coated onto a non-magnetic substrate. Another method is by dissolving the diester in a suitable solvent such as isopropyl alcohol to form a diester solution and immersing a non-magnetic substrate having a magnetic layer previously formed thereon in the solution. Alternatively, the diester solution is coated or sprayed onto a magnetic layer previously formed on a non-magnetic substrate whereby the magnetic layer is impregnated with the diester.

In the magnetic recording medium of the invention, any conventional lubricant may be used along with the unsaturated fatty acid diester. In such a case, the unsaturated fatty acid diester should occupy at least 3% by weight of the lubricants combined.

With respect to the ferromagnetic powder used in the magnetic layer, any of ferromagnetic powders used in conventional magnetic recording media can be used. Useful examples are well-known ferromagnetic metal fine powders including iron oxide particles such as $\gamma$-$Fe_2O_3$, cobalt-adsorbed $\gamma$-$Fe_2O_3$, $Fe_3O_4$, and cobalt-adsorbed $Fe_3O_4$, fine oxide particles such as $CrO_2$, barium ferrite, and strontium ferrite, and metals such as Fe, Co and Ni and their alloys in fine powder form. The ferromagnetic powder used herein is generally in acicular, spindle, plate or granular form. Magnetic qualities such as coercivity Hc and saturation magnetization $\sigma_s$ are not critical. With respect to these factors, a choice may be made depending on the intended use of magnetic recording medium.

The binder used in the magnetic layer is not particularly limited. Useful binders include polyurethane, polyvinyl chloride, polyurethane acrylate, polyesters, vinyl chloride-vinyl acetate copolymers, polyacrylonitrile, nitrile rubber, epoxy resins, alkyd resins, polyamides, polyacrylates, polymethaorylates, polyvinyl acetate, maleic acid-modified vinyl chloride-vinylidene chloride copolymers, polycarbonate, cellulose derivatives, vinyl chloride-vinylidene chloride copolymers, polyvinyl acetal, etc. The binders may be used alone or in admixture of two or more. A particular polar group or functional group may be incorporated into the resin. There may be added plasticizers, curing agents and other additives. The resins used herein may be thermosetting or electron radiation-curable resins, with the electron radiation-curable resins being preferred. The content of the binder in the magnetic paint is not particularly limited although about 5 to about 120 parts by weight, especially about 10 to about 100 parts by weight of the binder is preferably present per 100 parts by weight of the ferromagnetic powder.

For curing the electron radiation-curable resins, electron radiation is irradiated preferably in a dose of 1 to 10 Mrad, more preferably 3 to 7 Mrad. The irradiation energy or accelerating voltage is preferably at least 100 kV, more preferably at least 150 kV. The preferred stage of electron irradiation is after coating and drying of a magnetic paint and before winding on a roll. Electron irradiation may also be done after roll winding.

Any desired solvent may be used for the magnetic paint used herein. Useful solvents include ketones such as methyl ethyl ketone, methyl isobutyl ketone, acetone, and cyclohexanone, and aromatic solvents such as toluene, alone or in admixture of two or more. A suitable solvent may be selected for a particular purpose. The content of the solvent in the magnetic paint is not particularly limited although about 100 to about 1,000 parts by weight of the solvent is preferably present per 100 parts by weight of the ferromagnetic powder.

In the magnetic paint, fine inorganic particles such as $\alpha$-$Al_2O_3$, $Cr_2O_3$, $TiO_2$, SiC, and $\alpha$-$Fe_2O_3$ may be contained for increasing the mechanical strength of the magnetic layer. Carbon black and various other additives may also be added to the magnetic paint, if desired.

The magnetic layer often has a thickness of about 0.1 to 5 μm. In general, the magnetic layer is formed by coating a magnetic paint to a substrate by a conventional technique and subjecting the coating to orientation in a magnetic field or mechanical orientation, followed by drying, surface smoothing, and curing of the coating. If desired, undercoat and backcoat layers may be formed.

EXAMPLE

Examples of the present invention are given below by way of illustration and not by way of limitation. All parts are by weight. Abbreviation EB is for an electron beam, DBP is for dibutyl phthalate, MEK is for methyl ethyl ketone. BET is a specific surface area as measured by a BET method. GPC-Mn is a number average molecular weight as measured by gel permeation chromatography.

Example 1

A double-sided floppy disk was manufactured. A magnetic paint was prepared by dispersing the following ingredients in a sand grinder mill.

| Ingredient | Parts by weight |
|---|---|
| Cobalt-adsorbed γ-iron oxide (BET 22 m²/g, Hc 700 Oe, σ, 79 emu/g) | 100 |
| Carbon black (particle size 20 nm, BET 200 m²/g, DBP oil absorption 130 ml/100 g) | 12 |
| Carbon black (particle size 340 nm, BET 8 m²/g, DBP oil absorption 41 ml/100 g) | 2 |
| α-alumina (particle size 200 nm, α-conversion rate 45%) | 10 |
| EB-curable carboxyl-containing vinyl chloride resin (EB functional group 14 groups/molecule, degree of polymerization 400, carboxyl content 1 wt %) 25% solution | 92 |
| EB-curable phosphorus polar group-containing urethane resin (EB functional group 6 groups/molecule, GPC-Mn 26,000) 40% solution | 25 |
| MEK | 47 |
| Toluene | 23 |
| Cyclohexanone | 86 |

To the mixture were added the following ingredients.

| Ingredient | Parts by weight |
|---|---|
| Butyl stearate | 1 |
| Sorbitan monostearate | 2 |
| Neopentyl glycol dioleate | 7 |
| MEK | 38 |
| Toluene | 19 |
| Cyclohexanone | 69 |

Further dispersion completed the magnetic paint. The magnetic paint was coated to either surface of a non-magnetic substrate of 75 μm thick, dried, and calendered to form a magnetic layer of 1.0 μm on either surface. By operating an electron curtain type electron accelerator at an accelerating voltage of 150 keV and an electrode current of 10 main a nitrogen atmosphere, electrons were irradiated in a dose of 5 Mrad for curing the magnetic layers. The coated substrate was punched into a doughnut shape of 3.5 inches in diameter, obtaining a floppy disk.

Examples 2–7

Floppy disks were manufactured by the same procedure as in Example 1 except that the amount of neopentyl glycol dioleate added and the thickness of the magnetic layer were changed as shown in Table 1.

TABLE 1

| Example | Amount of neopentyl glycol dioleate added | Magnetic layer thickness (μm) |
|---|---|---|
| 1 | 7.0 pbw | 1.0 |
| 2 | 7.0 pbw | 0.1 |
| 3 | 7.0 pbw | 0.3 |
| 4 | 0.3 pbw | 1.0 |

TABLE 1-continued

| Example | Amount of neopentyl glycol dioleate added | Magnetic layer thickness (μm) |
| --- | --- | --- |
| 5 | 1.5 pbw | 1.0 |
| 6 | 14.0 pbw | 1.0 |
| 7 | 18.0 pbw | 1.0 |

Examples 8–14

Floppy disks were manufactured by the same procedure as in Example 1 except that the lubricants shown in Table 2 were used instead of neopentyl glycol dioleate.

TABLE 2

| Example | Lubricant |
| --- | --- |
| 8 | neopentyl glycol dielaidate |
| 9 | ethylene glycol dioleate |
| 10 | ethylene glycol dilinolate |
| 11 | propylene glycol dioleate |
| 12 | diethylene glycol dioleate |
| 13 | neopentyl glycol dipalmitoleate |
| 14 | ethylene glycol dierucate |

Example 15

A double-sided floppy disk was manufactured. A magnetic paint was prepared by dispersing the following ingredients in a sand grinder mill.

| Ingredient | Parts by weight |
| --- | --- |
| Cobalt-adsorbed γ-iron oxide (BET 22 m²/g, Hc 700 Oe, σ, 79 emu/g) | 100 |
| Carbon black (particle size 20 nm, BET 200 m²/g, DBP oil absorption 130 ml/100 g) | 12 |
| Carbon black (particle size 340 nm, BET 8 m²/g, DBP oil absorption 41 ml/100 g) | 2 |
| α-alumina (particle size 200 nm, α-conversion rate 45%) | 10 |
| Thermosetting vinyl chloride resin (MR-110 available from Nippon Zeon K.K.) | 23 |
| Thermosetting urethane resin (UR-8200 available from Toyobo K.K.) | 25 |
| MEK | 61 |
| Toluene | 30 |
| Cyclohexanone | 69 |

To the mixture were added the following ingredients.

| Inredient | Parts by weight |
| --- | --- |
| Butyl stearate | 1 |
| Sorbitan monostearate | 2 |
| Neopentyl glycol dioleate | 7 |
| MEK | 38 |
| Toluene | 19 |
| Cyclohexanone | 69 |

Further dispersion completed the magnetic paint. To 1,000 parts of the magnetic paint was added 19 parts of a curing agent commercially available as Colonate L from Nihon Polyurethane Kogyo K.K. The magnetic paint was coated to either surface of a non-magnetic substrate (as in Example 1) to form a magnetic layer of 1.0 μm thick on either surface. The coated substrate was punched into a doughnut shape of 3.5 inches in diameter and allowed to stand at 60° C. over 24 hours, obtaining a floppy disk.

Example 16

A magnetic paint was prepared as in Example 1 except that neopentyl glycol dioleate was omitted from the composition. The magnetic paint was coated onto a non-magnetic substrate. A solution of 50 parts of neopentyl glycol dioleate in 1,000 parts of isopropyl alcohol was applied to the magnetic layers. The application of the neopentyl glycol dioleate solution to the magnetic layer was in such an amount that 7 parts of neopentyl glycol dioleate was available per 100 parts of the ferromagnetic powder. Thereafter, as in Example 1, the magnetic layers were cured by electron irradiation. The coated substrate was punched into a doughnut shape of 3.5 inches in diameter, obtaining a floppy disk.

Comparative Example 1

A floppy disk was manufactured by the same procedure as in Example 1 except that neopentyl glycol dioleate was omitted from the paint composition.

Comparative Example 2

A floppy disk was manufactured by the same procedure as in Example 1 except that 25 parts of neopentyl glycol dioleate was added to the paint composition.

Comparative Examples 3–9

Floppy disks were manufactured by the same procedure as in Example 1 except that the lubricants shown in Table 3 were used instead of neopentyl glycol dioleate, but in the same amount.

TABLE 3

| Comparative Example | Lubricant |
| --- | --- |
| 3 | propylene glycol monooleate |
| 4 | ethylene glycol distearate |
| 5 | oleyl oleate |
| 6 | isocetyl oleate |
| 7 | isocetyl stearate |
| 8 | glycerin trioleate |
| 9 | glycerin tristearate |

Each of the floppy disks of Examples 1–16 and Comparative Examples 1–9 was mounted in a plastic jacket. The disk was inserted into a drive and continuously operated for 200 hours in a room temperature/high humidity environment (25° C./RH 80%). Changes in starting torque and dynamic torque before and after the 200-hour continuous write/read operation were determined.

The disks were also tested for durability by performing continuous write/read operation under the following conditions and measuring the time until the output was reduced to 80% of the initial.

Test conditions

Drive: floppy disk drive FD-1137 manufactured by NEC
Environment:

Low temperature (0° C.)

High temperature/low humidity (60° C./RH 10%)

Thermal cycling (Temperature and humidity were changed every 24 hours according to the pattern of FIG. 1.)

At the same time, the deposition of foreign matter to the magnetic head in each environment was observed. Deposits were evaluated according to the following criterion.

O: no deposit under microscopic observation

O: no deposit to naked eyes
Δ: some deposits to naked eyes
X: much deposits
The results are shown in Table 4.

TABLE 4

| | Torque [0→200 hr.] | | | | |
|---|---|---|---|---|---|
| | Starting | Dynamic | Durability (hr./deposit) | | |
| Run No. | torque (g · cm) | torque (mA) | Low temp. | High temp. low humid | Thermal cycling |
| Example 1 | 77→70 | 47→50 | 1618/◉ | 1615/◉ | 1212/◉ |
| Example 2 | 77→72 | 48→50 | 1568/◉ | 1587/◉ | 1135/◉ |
| Example 3 | 76→73 | 48→51 | 1606/◉ | 1602/◉ | 1162/◉ |
| Example 4 | 76→74 | 51→53 | 1455/◉ | 1470/◉ | 1102/◉ |
| Example 5 | 77→74 | 49→51 | 1521/◉ | 1545/◉ | 1066/◉ |
| Example 6 | 79→75 | 47→49 | 1602/◉ | 1611/◉ | 1225/◉ |
| Example 7 | 79→76 | 47→51 | 1620/◉ | 1597/◉ | 1240/◉ |
| Example 8 | 78→75 | 48→51 | 1589/◉ | 1593/◉ | 1196/◉ |
| Example 9 | 77→74 | 48→50 | 1602/◉ | 1598/◉ | 1203/◉ |
| Example 10 | 79→75 | 47→49 | 1568/◉ | 1577/◉ | 1167/◉ |
| Example 11 | 78→73 | 47→50 | 1571/◉ | 1578/◉ | 1173/◉ |
| Example 12 | 79→76 | 49→51 | 1600/◉ | 1598/◉ | 1192/◉ |
| Example 13 | 78→77 | 48→50 | 1589/◉ | 1600/◉ | 1190/◉ |
| Example 14 | 79→76 | 47→49 | 1593/◉ | 1587/◉ | 1189/◉ |
| Example 15 | 76→73 | 46→49 | 1598/◉ | 1598/◉ | 1196/◉ |
| Example 16 | 79→73 | 45→48 | 1585/◉ | 1588/◉ | 1151/◉ |
| Comparison 1 | 90→90 | 81→90 | 151/◉ | 212/◉ | 34/◉ |
| Comparison 2 | 83→79 | 45→48 | 1620/O | 1601/Δ | 1242/O |
| Comparison 3 | 86→84 | 57→59 | 450/◉ | 250/◉ | 250/◉ |
| Comparison 4 | 81→81 | 53→54 | 231/◉ | 346/◉ | 43/◉ |
| Comparison 5 | 85→83 | 52→52 | 1350/◉ | 1301/O | 905/O |
| Comparison 6 | 80→81 | 53→54 | 812/◉ | 603/◉ | 573/O |
| Comparison 7 | 89→87 | 78→80 | 989/O | 1108/◉ | 751/O |
| Comparison 8 | 105→102 | 44→44 | 1205/Δ | 1210/x | 801/x |
| Comparison 9 | 98→95 | 46→48 | 1232/Δ | 1001/Δ | 601/Δ |

Example 17

A double-sided floppy disk was manufactured. A magnetic paint was prepared by dispersing the following ingredients in a sand grinder mill.

| Ingredient | Parts by weight |
|---|---|
| Metallic magnetic powder | 100 |
| (BET 40 m²/g, Hc 1640 Oe, σ, 137 emu/g) | |
| Carbon black (particle size 340 nm, | 4 |
| BET 8 m²/g, DBP oil absorption 41 ml/100 g) | |
| α-alumina (particle size 200 nm, | 12 |
| α-conversion rate 60%) | |
| Thermosetting vinyl chloride resin | 15 |
| (MR-110 available from Nippon Zeon K.K.) | |
| Thermosetting urethane resin | 16 |
| (UR-8200 available from Toyobo K.K.) | |
| MEK | 70 |
| Toluene | 30 |
| Cyclohexanone | 100 |

To the mixture were added the following ingredients.

| Inredient | Parts by weight |
|---|---|
| Butyl stearate | 1 |
| Sorbitan monostearate | 3 |
| Neopentyl glycol dioleate | 5 |
| MEK | 46 |
| Toluene | 20 |
| Cyclohexanone | 66 |

Further dispersion completed the magnetic paint. To 1,000 parts of the magnetic paint was added 12 parts of a curing agent commercially available as Colonate L from Nihon Polyurethane Kogyo K.K. On either surface of a non-magnetic substrate of 62 μm thick, an undercoat layer consisting essentially of carbon black, inorganic pigment, and binder was formed and the magnetic paint was then coated onto the undercoat layer, followed by drying and calendering. In this way, the magnetic layer of 0.3 μm thick and the undercoat layer of 1.7 μm thick were formed on each surface of the substrate. The coated substrate was punched into a doughnut shape of 3.5 inches in diameter and allowed to stand at 60° C. over 24 hours, obtaining a floppy disk.

Comparative Example 10

A floppy disk was manufactured by the same procedure as in Example 17 except that oleyl oleate was used instead of neopentyl glycol dioleate, but in the same amount.

The floppy disks of Example 17 and Comparative Example 10 were tested by the same procedures as described above except that the drive used for measurement was FD-1331 manufactured by NEC. The results are shown in Table 5.

TABLE 5

| | Torque [0→200 hr.] | | | | |
|---|---|---|---|---|---|
| | Starting | Dynamic | Durability (hr./deposit) | | |
| Run No. | torque (g · cm) | torque (mA) | Low temp. | High temp. low humid | Thermal cycling |
| E 17 | 62→60 | 91→92 | 1780/OO | 1651/OO | 1310/OO |
| CE 10 | 66→74 | 103→104 | 1340/OO | 1001/O | 975/O |

Example 18

A double-sided floppy disk was manufactured. A magnetic paint was prepared by dispersing the following ingredients in a sand grinder mill.

| Ingredient | Parts by weight |
|---|---|
| Barium ferrite magnetic powder | 100 |
| (BET 30 m²/g, Hc 600 Oe, σ, 50 emu/g) | |
| Nitrocellulose | 11 |
| Polyurethane resin (N2304 available from | 12 |
| Nihon Polyurethane Kogyo K.K.) | |
| Carbon black (particle size 340 nm, | 4 |
| BET 8 m²/g, DBP oil absorption 41 ml/100 g) | |
| α-alumina (particle size 200 nm, | 12 |
| α-conversion rate 60%) | |
| MEK | 70 |
| Toluene | 30 |
| Cyclohexanone | 100 |

To the mixture were added the following ingredients.

| Inredient | Parts by weight |
|---|---|
| Butyl stearate | 1 |
| Sorbitan monostearate | 2 |
| Neopentyl glycol dioleate | 4 |
| MEK | 26 |
| Toluene | 13 |
| Cyclohexanone | 43 |

Further dispersion completed the magnetic paint. To 1,000 parts of the magnetic paint was added 10 parts of a curing agent commercially available as Colonate L from Nihon Polyurethane Kogyo K.K. On either surface of a non-magnetic substrate of 75 µm thick, a conductive undercoat layer was formed and the magnetic paint was then coated onto the undercoat layer, followed by drying and calendering. In this way, the magnetic layer of 0.5 µm thick and the undercoat layer of 1.5 µm thick were formed on each surface of the substrate. The coated substrate was punched into a doughnut shape of 3.5 inches in diameter and allowed to stand at 60° C. over 24 hours, obtaining a floppy disk.

Comparative Example 11

A floppy disk was manufactured by the same procedure as in Example 18 except that oleyl oleate was used instead of neopentyl glycol dioleate, but in the same amount.

The floppy disks of Example 18 and Comparative Example 11 were tested by the same procedures as described above except that the drive used for measurement was PD-212 manufactured by K.K. Toshiba. The results are shown in Table 6.

TABLE 6

| | Torque [0→200 hr.] | | Durability (hr./deposit) | | |
|---|---|---|---|---|---|
| | Starting | Dynamic | | | |
| Run No. | torque (g · cm) | torque (mA) | Low temp. | High temp. low humid | Thermal cycling |
| E 18 | 43→41 | 37→43 | 1340/OO | 1578/OO | 1310/OO |
| CE 11 | 52→52 | 51→59 | 1081/OO | 1472/O | 898/O |

Example 19

A video tape having a magnetic layer was manufactured. A magnetic paint was prepared by dispersing the following ingredients in a sand grinder mill.

| Ingredient | Parts by weight |
|---|---|
| Metallic magnetic powder (BET 57 m²/g, Hc 1650 Oe, σ, 120 emu/g) | 100 |
| α-alumina (particle size 0.2 µm, α-conversion rate 60%) | 5 |
| Thermosetting vinyl chloride resin (MR-110 available from Nippon Zeon K.K.) | 10 |
| Thermosetting urethane resin (UR-8200 available from Toyobo K.K.) | 15 |
| MEK | 47 |
| Toluene | 23 |
| Cyclohexanone | 86 |

To the mixture were added the following ingredients.

| Inredient | Parts by weight |
|---|---|
| Stearic acid | 1 |
| Butyl stearate | 1 |
| Neopentyl glycol dioleate | 1 |
| MEK | 38 |
| Toluene | 19 |
| Cyclohexanone | 69 |

Further dispersion completed the magnetic paint. To 1,000 parts of the magnetic paint was added 10 parts of a curing agent commercially available as Colonate L from Nihon Polyurethane Kogyo K.K. On one surface of a non-magnetic substrate film of 8 µm thick, an undercoat layer consisting essentially of an inorganic pigment and a binder was formed and the magnetic paint was then coated onto the undercoat layer, followed by drying and calendering. In this way, the magnetic layer of 0.3 µm thick and the undercoat layer of 1.7 µm thick were formed on one surface of the substrate. A backcoat layer was formed on the other surface of the substrate. The coated substrate was allowed to stand at 60° C. over 24 hours and slit to a width of 8 mm, obtaining a video tape.

Comparative Example 12

A video tape was manufactured by the same procedure as in Example 19 except that oleyl oleate was used instead of neopentyl glycol dioleate, but in the same amount.

Each of the video tapes of Example 19 and Comparative Example 12 was mounted in a plastic cassette. A 8-mm video tape recorder EV-S900 manufactured by Sony Corporation was loaded with the cassette and operated in a low-temperature environment for examining still durability. The time taken in the still mode until the output lowered below 80% of the initial was measured. The results are shown in Table 7.

TABLE 7

| | Still operating time | Head clogging |
|---|---|---|
| Example 19 | 45 min. | no clogging |
| Comparative Example 12 | 25 min. | some clogging |

As is evident from Tables 4 to 7, the magnetic recording media of the present invention is improved over conventional magnetic recording media in that no lubricant bleeds out and hence, the magnetic head is not contaminated. In the floppy disk form, torque characteristics and durability, especially in a thermal cycling environment are excellent. In the video tape form, still performance and head clogging prevention are excellent.

Although some preferred embodiments have been described, many modifications and variations may be made thereto in the light of the above teachings. It is therefore to be understood that within the scope of the appended claims, the invention may be practiced otherwise than as specifically described.

We claim:

1. A magnetic recording medium comprising a non-magnetic substrate and a magnetic layer thereon, said magnetic layer containing a thermoset or electron-cured resin binder and dispersed therein a ferromagnetic powder and a lubricant, wherein at least 3% by weight of said lubricant comprises an unsaturated fatty acid diester of dihydric alcohol having 2 to 6 carbon atoms and an unsaturated fatty acid having 14 to 24 carbon atoms and 1 to 4 unsaturated bonds.

2. The magnetic recording medium of claim 1 wherein said dihydric alcohol is at least one normal or branched, saturated or unsaturated dihydric alcohol.

3. The magnetic recording medium of claim 1 wherein said unsaturated fatty acid is at least one member selected from the group consisting of palmitoleic acid, petroselinic acid, oleic acid, linoleic acid, linolenic acid, and erucic acid.

4. The magnetic recording medium of claim 1 wherein said unsaturated fatty acid diester is neopentyl glycol dioleate.

5. The magnetic recording medium of claim 1 wherein said magnetic layer contains 100 parts by weight of the ferromagnetic powder and about 0.1 to about 20 parts by weight of said unsaturated fatty acid diester per 100 parts by weight of the ferromagnetic powder.

6. The magnetic recording medium of claim 5, wherein said magnetic layer contains about 0.3 to about 18 parts by weight of said unsaturated fatty acid diester per 100 parts by weight of the ferromagnetic powder.

7. The magnetic recording medium of claim 5, wherein said magnetic layer contains about 1 to about 15 parts by weight of said unsaturated fatty acid diester per 100 parts by weight of the ferromagnetic powder.

8. The magnetic recording medium of claim 5, wherein said magnetic layer contains about 3 to about 12 parts by weight of said unsaturated fatty acid diester per 100 parts by weight of the ferromagnetic powder.

9. The magnetic recording medium of claim 5, wherein said magnetic layer contains about 5 to 120 parts by weight of said binder per 100 parts by weight of the ferromagnetic powder.

* * * * *